US008984414B2

(12) United States Patent
Stevens

(10) Patent No.: US 8,984,414 B2
(45) Date of Patent: Mar. 17, 2015

(54) FUNCTION EXTENSION FOR BROWSERS OR DOCUMENTS

(75) Inventor: Adam Stevens, Dublin (IE)

(73) Assignee: Google Inc., Mountain View, CA (US)

(*) Notice: Subject to any disclaimer, the term of this patent is extended or adjusted under 35 U.S.C. 154(b) by 153 days.

(21) Appl. No.: 13/290,636

(22) Filed: Nov. 7, 2011

(65) Prior Publication Data
US 2013/0117716 A1 May 9, 2013

(51) Int. Cl.
*G06F 3/00* (2006.01)
*G06F 17/30* (2006.01)

(52) U.S. Cl.
CPC .... *G06F 17/30873* (2013.01); *G06F 17/30902* (2013.01)
USPC ............ 715/744; 715/841; 715/764; 709/203

(58) Field of Classification Search
CPC ... G06F 3/0482; G06F 3/04883; G06F 3/048; G06F 3/0484; G06F 3/0481; G06F 9/4443
USPC ............................ 715/841, 764, 744; 709/203
See application file for complete search history.

(56) References Cited

U.S. PATENT DOCUMENTS

| | | | | |
|---|---|---|---|---|
| 5,204,947 A * | 4/1993 | Bernstein et al. | ............. | 715/854 |
| 5,796,393 A * | 8/1998 | MacNaughton et al. | ...... | 715/733 |
| 5,821,927 A * | 10/1998 | Gong | ............................. | 715/822 |
| 5,870,559 A * | 2/1999 | Leshem et al. | ................. | 709/224 |
| 6,020,884 A * | 2/2000 | MacNaughton et al. | ...... | 715/747 |
| 6,025,844 A * | 2/2000 | Parsons | ........................... | 715/805 |
| 6,104,401 A * | 8/2000 | Parsons | ........................... | 715/804 |
| 6,144,380 A * | 11/2000 | Shwarts et al. | ................ | 715/863 |
| 6,243,071 B1 * | 6/2001 | Shwarts et al. | ................ | 715/823 |
| 6,243,089 B1 * | 6/2001 | Gong | ............................... | 715/744 |
| 6,433,795 B1 * | 8/2002 | MacNaughton et al. | ...... | 715/738 |
| 6,950,983 B1 * | 9/2005 | Snavely | .......................... | 715/206 |
| 7,085,994 B2 * | 8/2006 | Gvily | .............................. | 715/234 |
| 7,412,655 B2 * | 8/2008 | Wada et al. | .................... | 715/744 |
| 7,676,762 B2 * | 3/2010 | Shafron | .......................... | 715/826 |
| 7,712,033 B2 * | 5/2010 | Shafron | .......................... | 715/744 |

(Continued)

FOREIGN PATENT DOCUMENTS

WO     WO 01/61508 A1    8/2001
WO     WO 2005/017670 A2    2/2005

OTHER PUBLICATIONS

Adam Zastawski—"Very nice feature in IE8", Jun. 16, 2009.*

(Continued)

*Primary Examiner* — Steven Sax
*Assistant Examiner* — David Choi
(74) *Attorney, Agent, or Firm* — Sterne, Kessler, Goldstein & Fox P.L.L.C.

(57) ABSTRACT

Computer implemented methods and systems for generating a menu of browser extensions. A first user interaction with a first set of information is detected. The first set of information is associated with one or more browser extensions. A first menu for display of the one or more browser extensions is generated. A second user interaction with the one or more associated browser extensions is detected, wherein the second user interaction executes at least one of the associated browser extensions. A second set of information is extracted from one or more uniform resource locators in response to the second user interaction with the one or more associated browser extensions. A second menu for display of the second set of information is generated.

16 Claims, 8 Drawing Sheets

(56) References Cited

U.S. PATENT DOCUMENTS

| | | | | |
|---|---|---|---|---|
| 8,032,837 B2* | 10/2011 | Bowman et al. | ............... | 715/760 |
| 8,190,703 B2* | 5/2012 | Lin et al. | ........................ | 709/217 |
| 8,200,962 B1* | 6/2012 | Boodman et al. | ............. | 713/161 |
| RE44,327 E* | 6/2013 | Katz | ............................ | 717/136 |
| 8,631,332 B2* | 1/2014 | Rose et al. | ..................... | 715/744 |
| 8,667,487 B1* | 3/2014 | Boodman et al. | ............. | 717/178 |
| 2002/0005867 A1* | 1/2002 | Gvily | ............................ | 345/760 |
| 2002/0033844 A1* | 3/2002 | Levy et al. | ...................... | 345/744 |
| 2003/0139827 A1* | 7/2003 | Phelps | ............................. | 700/36 |
| 2007/0156913 A1* | 7/2007 | Miyamoto et al. | ............. | 709/230 |
| 2008/0005678 A1* | 1/2008 | Buttner et al. | .................. | 715/744 |
| 2008/0163047 A1* | 7/2008 | Gossweiler et al. | .......... | 715/277 |
| 2008/0163048 A1* | 7/2008 | Gossweiler, III et al. | .... | 715/277 |
| 2008/0163088 A1* | 7/2008 | Pradhan et al. | ............... | 715/764 |
| 2008/0184141 A1 | 7/2008 | Selig | | |
| 2008/0184157 A1* | 7/2008 | Selig | ............................ | 715/781 |
| 2008/0201434 A1* | 8/2008 | Holmes et al. | ................. | 709/206 |
| 2009/0150796 A1* | 6/2009 | Buttner et al. | ................. | 715/744 |
| 2009/0150809 A1* | 6/2009 | Hirsch | .......................... | 715/764 |
| 2009/0164564 A1* | 6/2009 | Willis | ............................ | 709/203 |
| 2009/0172657 A1* | 7/2009 | Makelainen et al. | .......... | 717/174 |
| 2009/0240796 A1* | 9/2009 | Yokoyama et al. | ........... | 709/223 |
| 2009/0271707 A1* | 10/2009 | Lin et al. | ........................ | 715/738 |
| 2010/0169364 A1* | 7/2010 | Hardt | ............................ | 707/769 |
| 2012/0240049 A1* | 9/2012 | Britt et al. | ..................... | 715/744 |
| 2013/0117716 A1* | 5/2013 | Stevens | .......................... | 715/841 |
| 2013/0275917 A1* | 10/2013 | Norris, III | ..................... | 715/841 |

OTHER PUBLICATIONS

How-To Geek—"Translate Languages in IE8 with Bing Translator", Jun. 10, 2008.*

How-To Geek—"Troubleshoot and Manage Addons in Internet Explorer 8", Sep. 8, 2009.*

10 useful internet explorer 8 accelerators—2009.*

Previewing AMO's New Look_Mozilla Add-ons Blog.*

International Search Report and Written Opinion for International Application No. PCT/US2012/063503, European Patent Office, Netherlands, mailed Jan. 23, 2013, 10 pages.

* cited by examiner

FUNCTION EXTENSION FOR BROWSERS OR DOCUMENTS

BACKGROUND

1. Field

Embodiments are generally related to systems and methods of managing browser extensions.

2. Related

The Internet has allowed users to access significant amounts of information in a relatively short amount of time. As the Internet has evolved, web browsers have played a significant role, as the primary purpose of a web browser is to bring information resources to the user. However, there is always a need to improve the user experience. For example, internet users generally have to navigate away from the currently viewed web page in order to look for specific details regarding the information displayed on this web page. The user may want to find additional information regarding something they have read on the initial web page, and will have to spend time performing additional internet searches in order to obtain this information. This results in inefficient web-use and detracts from the overall user experience.

BRIEF SUMMARY

Embodiments described herein relate to computer implemented methods and systems for generating a menu of browser extensions. A first user interaction with a first set of information is detected. The first set of information is associated with one or more browser extensions. A first menu for display of the one or more browser extensions is generated. A second user interaction with the one or more associated browser extensions is detected, wherein the second user interaction executes at least one of the associated browser extensions. A second set of information is extracted from one or more uniform resource locators in response to the second user interaction with the one or more associated browser extensions. A second menu for display of the second set of information is generated.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Figure 1:
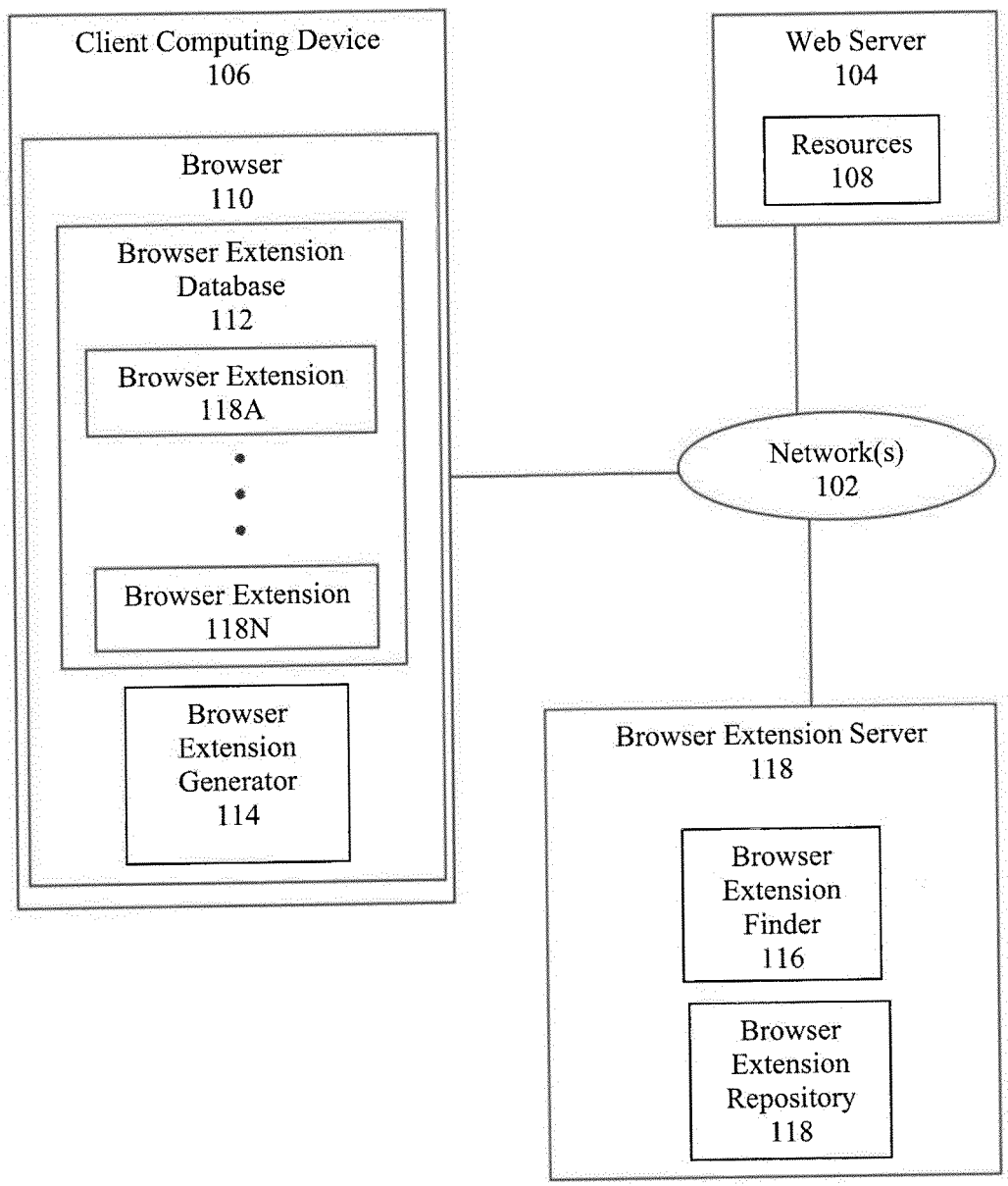
FIG. 1 is a diagram illustrating an exemplary system, according to an embodiment.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

A browser extension is a computer program that extends the functionality of a web browser in any number of ways. A browser extension system, as described herein, allows its users to retrieve information about content which is being created or viewed. In an example use of such a browser extension system, an individual may be accessing data using a browser for instance, the user may be viewing a website page that contains data such as a movie review article. When viewing the content of the web page, the user may have a desire to learn more information about certain aspects of the content. For example, the user may want to know additional information about the film, such as the producer, the year it was created, the rating, or theaters that may be showing the film. Using the browser extension system, the user may be able to interact with the content they are viewing in order to retrieve additional information about the content based on the kind of information sought.

In the example above, the browser extension system will allow the user to perform a first action such as a right or left click on the name of the movie in the article that is being viewed. The right or left click operation, will generate a list of one or more browser extensions, which will allow the retrieval of additional information about the movie. For example, a movie locator browser extension may display information showing all the theaters within a specified region, which is showing the movie. Another example may have a movie information browser extension, which may display data about the movie such as year created, producer, director or ratings. The user may perform a second action to select the browser extension based on the kind of information preferred. Upon the selection of the browser extension, said extension will be executed to retrieve and display the data requested. The requested data can be displayed within the current web page. The browser extension system has allowed the user to find out additional information about content viewed on a web page without requiring the user to perform any additional searching or leaving the current web page. It is noted that the embodiments are not limited to this example application, but are instead applicable to other applications as would be apparent to persons skilled in the art based on the teachings provided herein. For example, the browser extension system may allow access to additional information about books, people, or geography.

FIG. 1 is a block diagram illustrating a system 100 for generating a menu of browser extensions. System 100 includes a browser extension server 120, web server 104, and a client computing device 106 coupled via one or more networks 102, such as the Internet or local area network. Client computing device 106 includes a browser 110 and browser extension generator 114.

In general, system 100 operates as follows: A first user interaction with a first set of information on browser 110 is detected, which initiates browser extension generator 114. In response to the first user interaction, browser extension generator 114 associates the first set of information with one or more browser extensions 118A . . . 118N within browser extension database 112. Alternatively, browser extension generator 114 may communicate with browser extension server 120 via network 120 to request browser extensions which should be associated with the first set of information. A second user interaction with one or more associated browser extensions 118A . . . 118N initiates communication between browser 110 and webserver 104 via network 102 to retrieve a second set of information for display. The second set of information will be descriptive data about the first set of information as determined by the functionality of the executed browser extension 118A . . . 118N.

Network 102 may be any network or combination of networks that can carry data communications. Such a network 102 may include, but is not limited to, a local area network, metropolitan area network, and/or wide area network such as the Internet. Network 102 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 1, depending upon a particular application or environment.

Web server 104 is a computing device or an application executing on a computing device that hosts resources 108. Resources 108 are associated with a domain name and hosted by one or more web servers 104. Web server 104 delivers resources 108 to client computing device 106. Resources 108 is any data that can be provided over network 102. Resources 108 is identified by a resource address that is associated with each resource 108. Resources 108 may include, for example, hypertext markup language (HTML) pages, word processing documents, portable document format (PDF) documents, images, video, and feed sources. Resources 108 can include content, such as words, phrases, images and sounds, that may include embedded information (such as meta-information in hyperlinks) and/or embedded instructions (such as JavaScript scripts).

Client computing device 106 is a processor-based electronic device that is manipulated by a user and is capable of requesting and receiving resources 108 over network 102. Examples of client computing device 106 may include personal computers, mobile communication devices and tablet computers. Client computing device 106 typically includes an application, such as browser 110. A user may utilize browser 110 to request resources 108, such as HTML pages over network 102. For example, a user requests resources 108 by typing the resource address associated with resource 108 that is stored on web server 104. In response to the request, web server 104 delivers resources 108 to client computing device 106. When client computing device 106 receives resources 108 from web server 104, client computing device 106 uses browser 110 to display resources 108 to the user.

Browser 110 may be any kind of browser. Browser 110 may also include a browser extension database 112. Browser extension database 112 may be any type of structured memory, including a persistent memory. For example, browser extension database 112 may be implemented as an array, relational database or file system. Browser extension database 112 may include one or more browser extensions 118A . . . 118N. Browser extensions 118A . . . 118N extend the functionality of browser 110 and may also be referred to as "browser add-ons" or "browser plug-ins". Browser extensions 118A . . . 118N add additional functionality to browser 110 that enhances a user interface, for particular resources 108, such as an HTML page. Examples of browser extensions 118A . . . 118N may include extensions for resources 108 that provide weather information sites, online travel information sites, online movie information sites or an online currency conversion sites on client computing device 106. Browser extensions 118A . . . 118N may be downloaded from web server 104 or browser extension server 120 and installed on client computing device 106 as part of browser 110. In addition, browser extensions 118A . . . 118N may be downloaded from an online store such as the Google Chrome web store.

Browser extensions 118A . . . 118N may be developed by an application developer on client computing device 106 or any other computing device. A programming language, such as JavaScript may be used to develop browser extensions 118A . . . 118N on computing device 106. Browser extensions 118A . . . 118N may then be stored locally on client computing device 106 or may be uploaded to browser extension server 120. From browser extension server 120, browser extensions 118A . . . 118N may be distributed to additional client computing devices due to a request from a user. Browser extensions 118A . . . 118N may have a category identifier which determines the kind of browser extension. For example, a category identifier may classify a browser extension as a number of categories including, but not limited to, entertainment, geography, people, or tools. Category identifiers for browser extensions 118A . . . 118N may be stored in a manifest file for each browser extension 118A . . . 118N. The manifest file describes the browser extension and maps its location on disk to a resource address of resources 108. Category identifiers will be accessed upon execution of browser extension generator 114 to make browser extension associations after a first user interaction with a first set of information, which will be discussed in more detail below.

Figure 2:
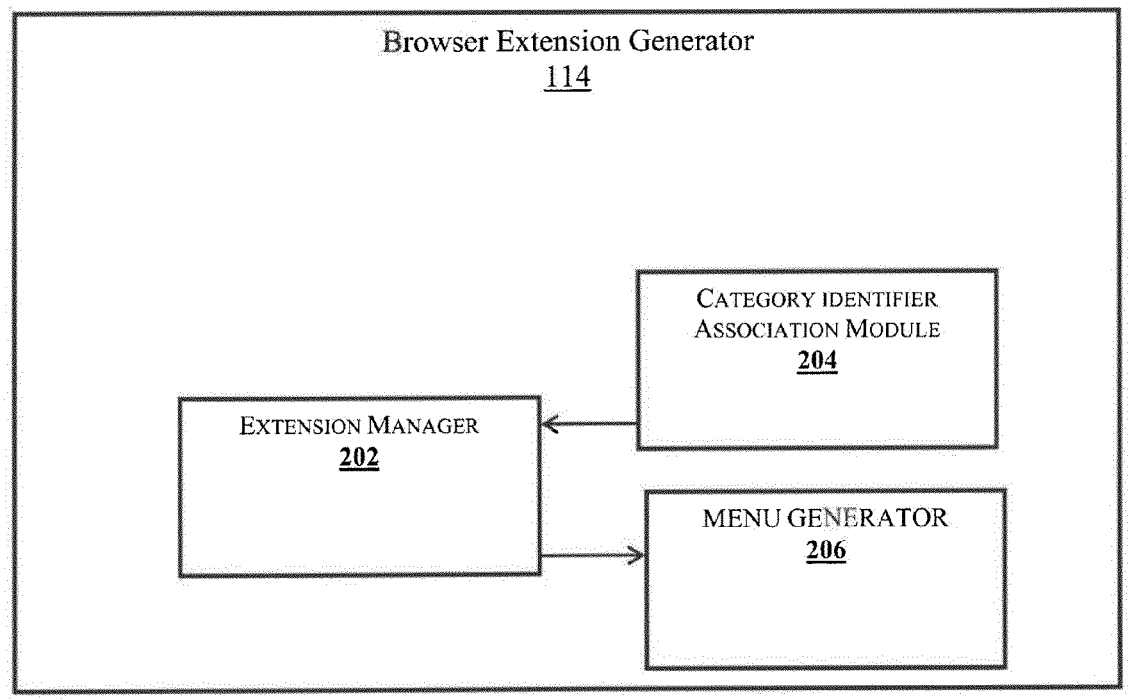
FIG. 2 is a detailed diagram illustrating an embodiment of an extension generator.
Figure 3:
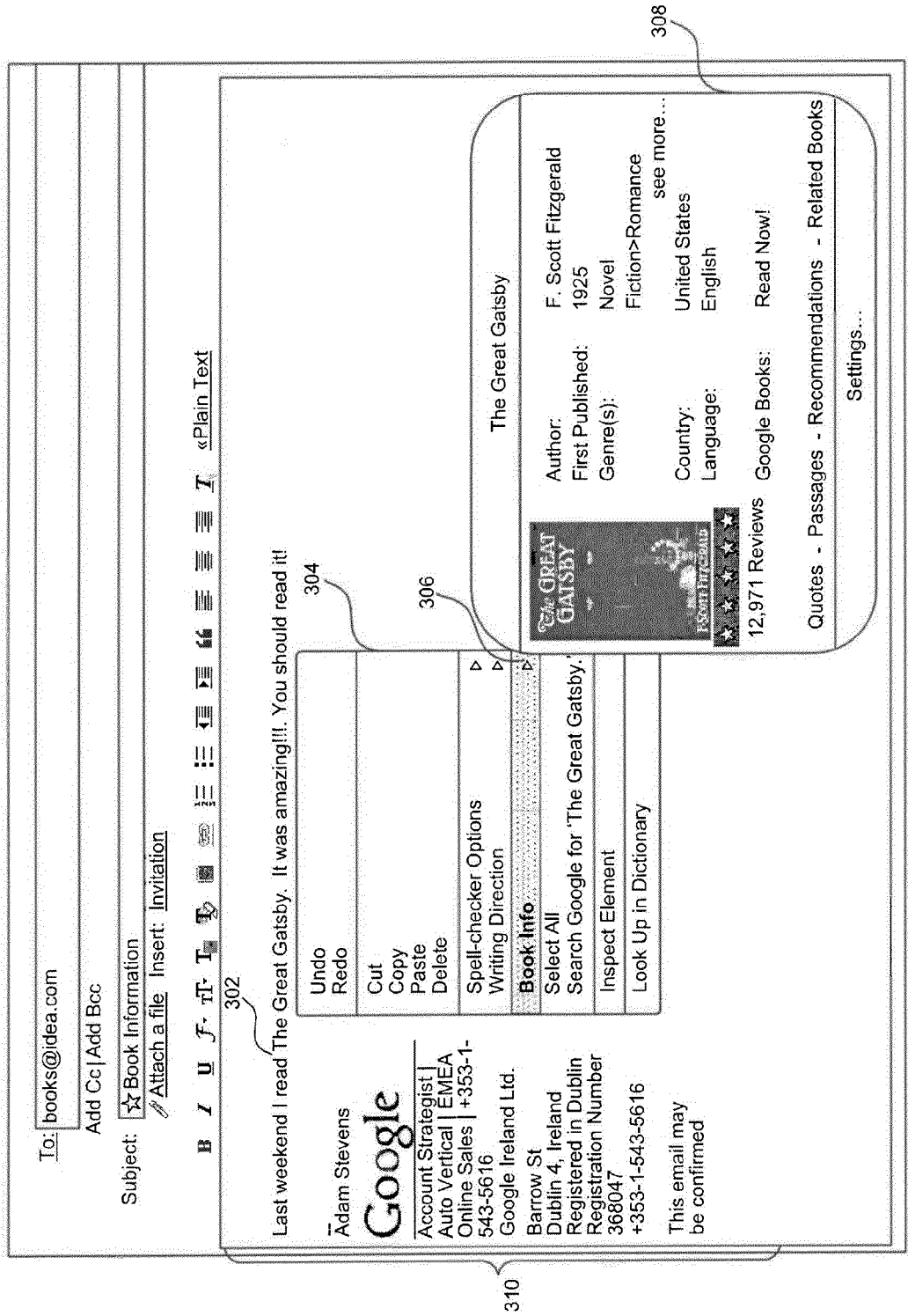
FIG. 3 is an illustration of an example display view of the browser extension system.

FIG. 2 is a block diagram of an exemplary browser extension generator 114. Browser extension generator 114 includes extension manager 202, category identifier association module 204, and menu generator 206. Further embodiments will be described using a combination of FIG. 1, FIG. 2 and FIG. 3 FIG. 3 is an illustration of an example display view of the browser extension system.

Browser extension generator 114, or any combination of its components, may be part of or may be implemented with a computing device. Examples of computing devices include, but are not limited to, a computer, workstation, distributed computing system, computer cluster, embedded system, standalone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

In one embodiment, a user is interacting with a web browser 310 which includes information such as keyword identifier 302. Keyword identifier 302 may be any kind of content, from which a user may want to obtain additional information. For example, keyword identifier 302 may be a word or group of words representing any person, place or thing. Web browser 304 may detect a first user interaction with keyword identifier 302. The first user interaction may be, for example and without limitation, a selection of keyword identifier 302, followed by a right or left click, a hover over keyword identifier 302, or a right or left click over keyword identifier 302. Once the first user interaction with keyword identifier 302 is detected, category identifier association module 204 associates keyword identifier 302 with one or more browser extensions 118A . . . 118N.

In an embodiment, category identifier association module 204 may parse keyword identifier 302 so that it may be passed to web server 104 to perform a web search for the parsed information. For example, category identifier association module 204 will parse keyword identifier 302 into a string format. The parsed keyword identifier 302 in string format will be passed to webserver 104 via network 102. Web server 104 will perform a query of the web for parsed keyword identifier 302 to determine one or more classifications for keyword identifier 302. For instance the book "The Great Gatsby" may represent keyword identifier 302, as shown in FIG. 3. A web search of the parsed string "The Great Gatsby" may identify keyword identifier 302 as falling within the classification of "book" or "entertainment". Upon identification of the classification of keyword identifier 302, extension manager 202 can perform a search of browser extension database 112 for browser extensions that match the identified classification. A search through browser extension database 112 includes accessing a manifest file for each browser extension 118A . . . 118N and comparing the category identifier of the browser extension with the classification of keyword identifier 302. One or more browser extensions 118A . . . 118N may be determined to be a match. Menu generator 206 will generate a menu for display of the one or more matching browser extensions 118A . . . 118N. For example, FIG. 3 illustrates a generation of menu 304, which displays a matching browser extension 306 entitled "Book Info". The user may now interact with the matching browser extension(s).

Web browser 310 may detect a second user interaction with the one or more matching browser extensions 118A . . . 118N, which will execute the selected browser extension(s). The second user interaction may be, for example and without limitation, a right click, left click, shift+click, or ctrl+click of one or more of the matching browser extensions 118A . . . 118N that are displayed in the generated menu 304. Extension manager 202 may execute the one or more browser extensions in response to the second user interaction. In an embodiment, extension manager 202 may execute the selected browser extension by communicating with web server 104. The selected browser extension may comprise HTML, CSS or Javascript files. The selected browser extensions may include multiples files configured to function cooperatively. The collective files may include a manifest file, which may include data about the extension. The manifest file may include browser extension initialization information along with a Uniform Resource Locator (URL). The URL identifies the location of the information used in executing the selected browser extension. For example, upon detecting a right or left click of browser extension 306, the "Book Info" browser extension can be executed. The manifest file of the "Book Info" extension may include the URL needed to obtain information that will be returned upon the completion of execution of the browser extension. In this instance, "Book Info" browser extension establishes communication with web server 104 over network 102. The URL in the manifest file is used to look up the information requested by the "Book Info" browser extension by making a request of resources 108. The "Book Info" browser extension is configured to search the website of the URL and return information about the book "The Great Gatsby", such as the author, the publishing date, the genre, etc. Menu generator 206 generates a second menu for display 408, which shows all of the information returned from the execution of the "Book Info" browser extension.

Overview of the Method

Figure 4:
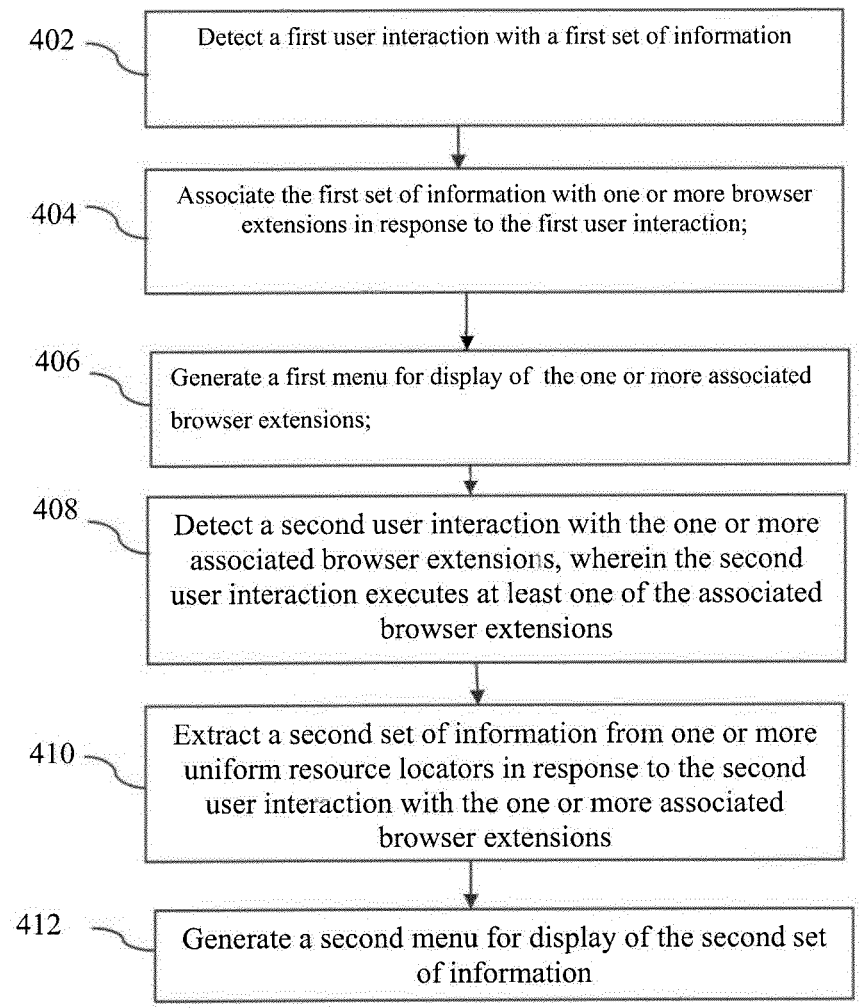
FIG. 4 is a flowchart of an exemplary method, according to an embodiment.
Figure 5:
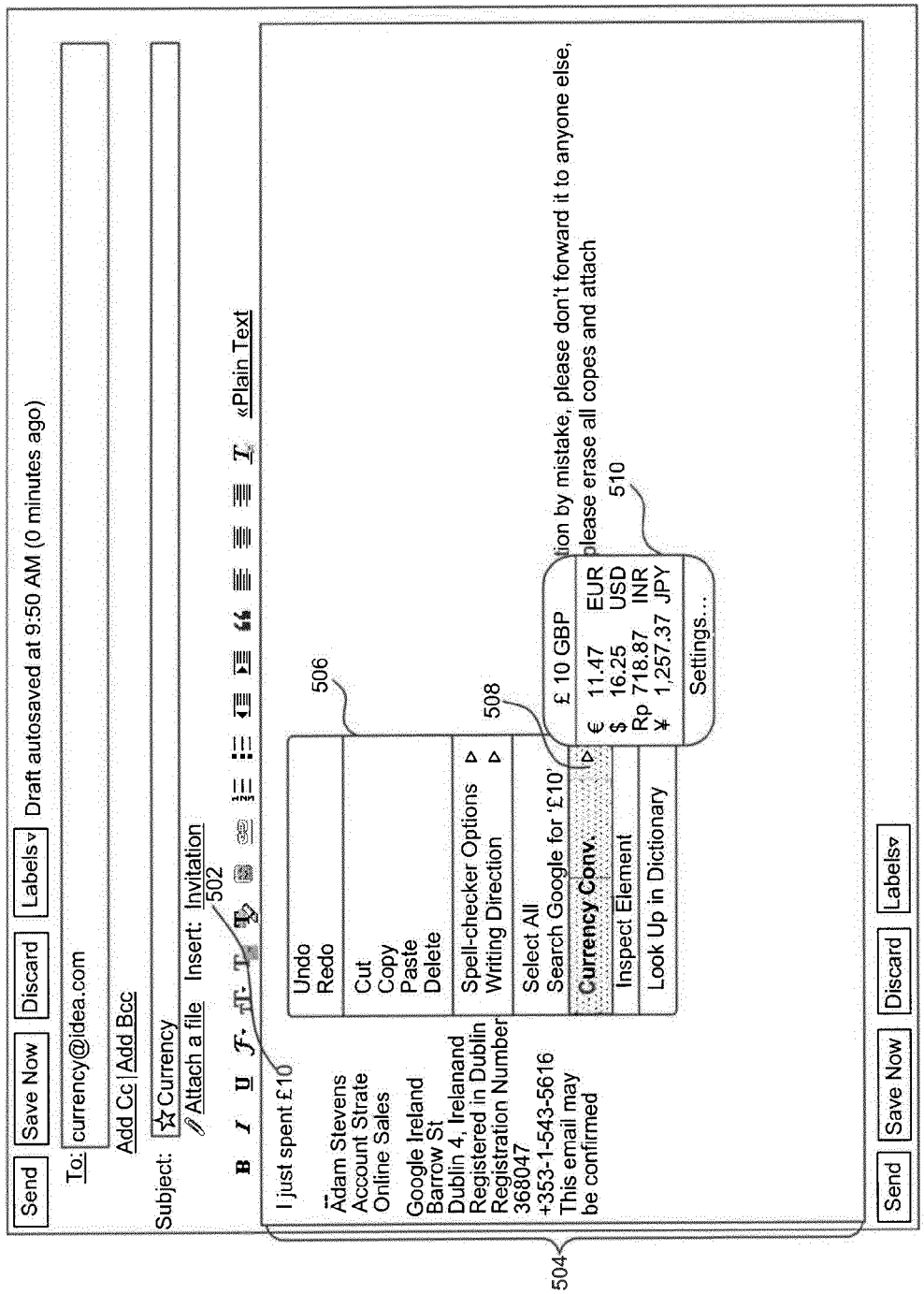
FIG. 5 is another illustration of an example display view of the browser extension system.

FIG. 4 is a flowchart of an exemplary method of generating a menu of browser extensions, according to an embodiment. FIG. 4 will be used in conjunction with FIG. 5 to describe embodiments. FIG. 5 is an illustration of an example display view of the browser extension system.

In stage 402, a first user interaction with a first set of information is detected. In an embodiment, stage 402 is performed by browser 110 on client computing device 106. In the example illustration FIG. 5, a first user interaction, such as a select followed by a right or left click can be detected by web browser 504, which resides on a computer device. The user may select and right or left click on keyword identifier 502, which is monetary value in this instance.

In stage 404, the first set of information is associated with one or more browser extensions in response to the first user interaction. In an embodiment, stage 404 is performed by browser extension generator 114 on client computing device 106. In the example illustration of FIG. 5, keyword identifier 502 which is a monetary value is associated with a "Currency Conv" browser extension 508. "Currency Conv" browser extension allows the user to see the conversion of the monetary amount which was selected with the first user interaction.

In stage 406, a first menu for display of the one or more associated browser extensions is generated. In an exemplary embodiment, stage 406 may be performed by browser extension generator 114 on client computing device 106. In the example illustration of FIG. 5, menu 506 is generated in response to the first user interaction with keyword identifier 502. The associated browser 508 is displayed on the generated menu 506. In this instance, keyword identifier 502 has been classified as a monetary value. This classification has been associated with a browser extension "Currency Conv", which has a matching category identifier within its manifest file.

In stage 408, a second user interaction with the one or more associated browser extensions is detected. In an embodiment, stage 408 is performed by browser 110 on client computing device 106. In the example illustration of FIG. 5, a second user interaction, such as a right or left click can be detected by web browser 504. This will execute the "Currency Conv" browser extension 508.

In stage 410, a second set of information from one or more uniform resource locators is extracted in response to the second user interaction with the one or more associated browser extension. In an embodiment, stage 410 is performed by browser extension generator 114 on client computing device 106. In the example illustration of FIG. 5, "Currency Conv" browser extension 508 will be executed in response to the second user interaction. The execution of the "Currency Conv" browser extension results in the retrieval of currency conversions for the selected monetary value 502. The manifest file of the "Currency Conv" browser extension may include the URL to visit, which will contain the information which needs to be extracted. In this instance, the URL is a conversion calculation website, which generates conversion data based on real-time currency rates. Keyword identifier 502, which represents the monetary value will be passed to the specified URL, which, in response, will generate the conversion and pass the data back to browser extension generator 114.

In stage 412, a second menu for display of the second set of information is generated. In an embodiment, stage 412 is performed by browser extension generator 114 on client computing device 106. In the example illustration of FIG. 5, menu 510 is generated in response to the second user interaction with browser extension 508. The "Currency Conv" browser extension has been executed, which resulted in the conversion of the keyword identifier 502. Menu 510 receives the resulting data from the execution of the "Currency Conv" browser extension and displays the conversions of the monetary amount for different countries.

Additional Features

Prior to utilizing browser extension generator 114, the user may have the ability to determine the kinds of browser extensions available for use. Browser extension database 112 stores a plurality of browser extensions 118A . . . 118N. Browser extensions 118A . . . 118N may reside on client computing device 106 after being programmed and stored on the client computing device 106 or being requested and downloaded from browser extension server 120 or web server 104.

In an embodiment, the user may not have any browser extensions associated with the keyword identifier stored on client computing device 106. Browser extension generator 114 will search browser extension database 112 and not find any matching browser extensions. Browser extension 114 may then be configured to make a request to browser extension server 120 to find matching browser extensions. Browser extension server 120 includes browser extension finder 116 and browser extension repository 122. Browser extension repository 122 stores a plurality of browser extensions in categorized groups for ease of searching. Browser extension finder 116 can search the browser extension repository 122 for category matches with the keyword identifier classification using a search and retrieval algorithm performed by browser extension generator 114. In an embodiment, browser extensions stored within browser extension repository 122 may have a counter flag indicating the number of times the browser extension has been executed by users of the browser extension server 120. Upon a finding of browser extension matches, the user will be presented with a list of the top browser extensions within the specified category based on the counter flag.

Figure 7:
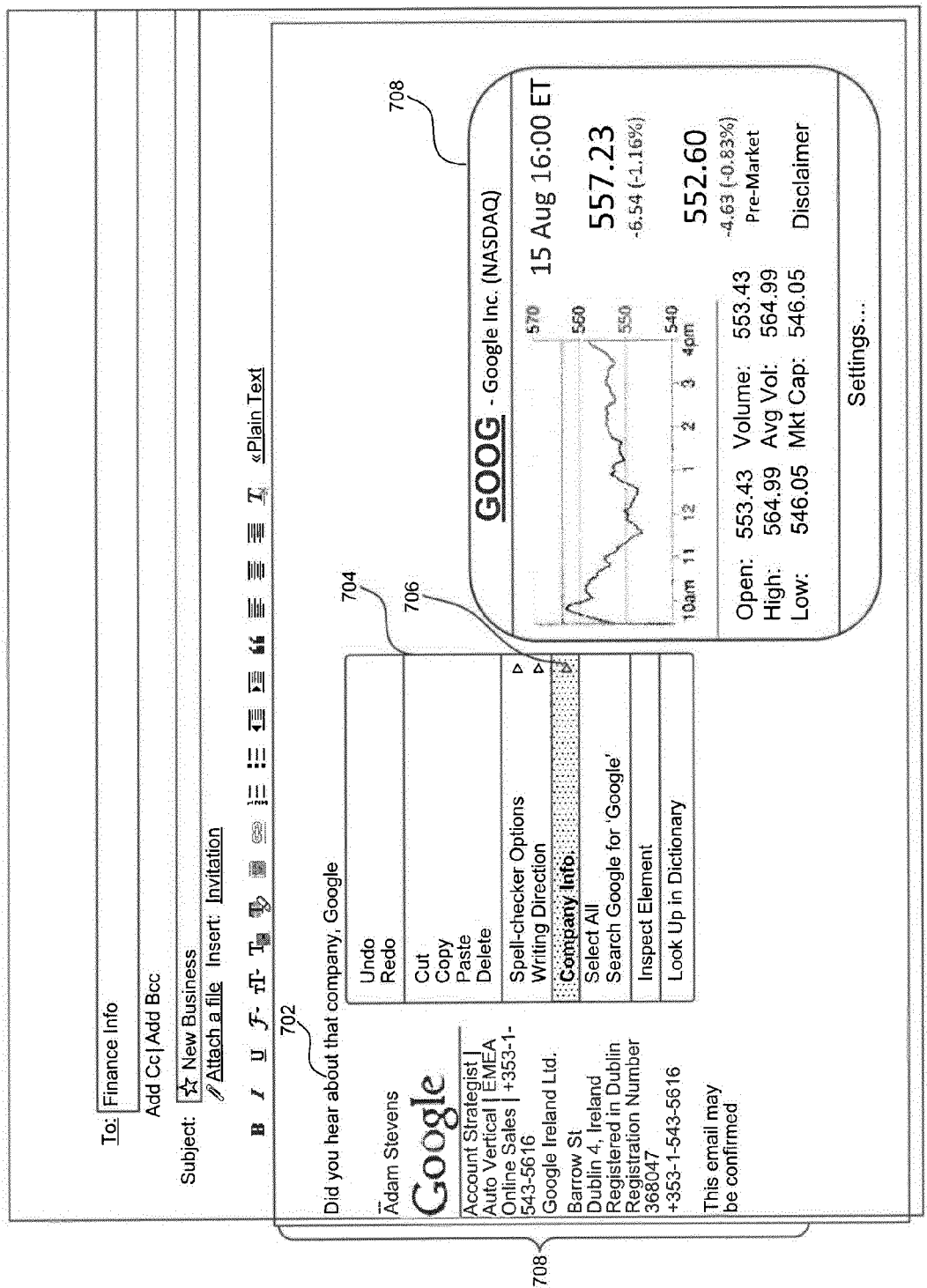
FIG. 7 is another illustration of an example display view of the browser extension system.
Figure 8:
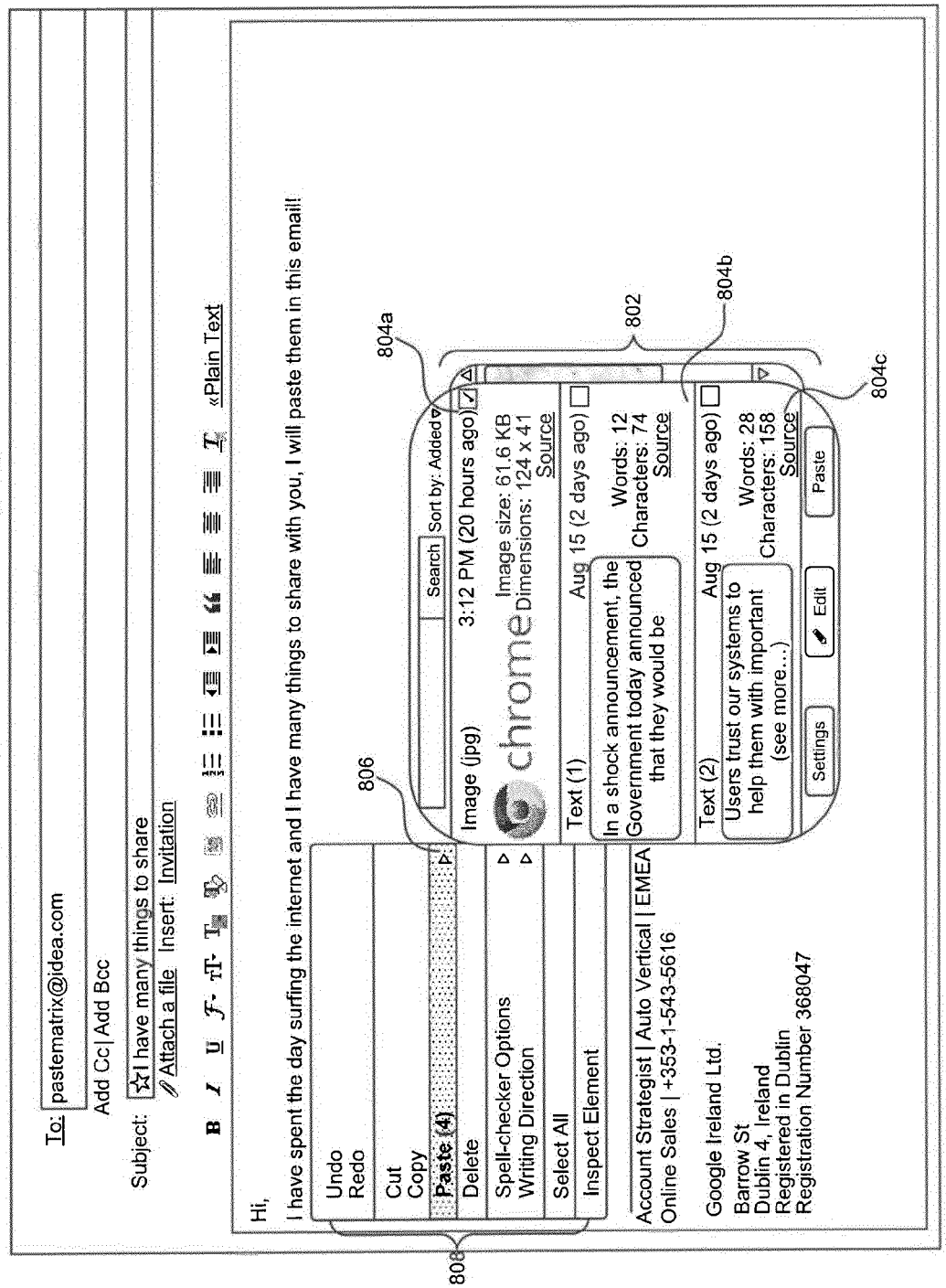
FIG. 8 is another illustration of an example display view of the browser extension system.

As discussed previously, browser extensions 118A . . . 118N extend the functionality of browser 110 and add additional functionality to browser 110 that enhances a user interface. As illustrated in FIG. 7 and FIG. 8, browser extensions 118A . . . 118N may provide other functionality than discussed in previous embodiments. FIG. 7 illustrates a browser extension that may provide financial information about a company. Upon execution, the browser extension may return for display the latest market information regarding the company. FIG. 8 illustrates a history browser extension. Upon execution, the browser extension may return a list of the most recent sites visited (804a, 804b, 804c) by the user along with information that may have been tagged or bookmarked by the user. The user may select from the display, information that may want to share via email or text, for example. In an embodiment, the browser extensions illustrated in FIG. 7 and FIG. 8, may be executed in a similar manner, as discussed in previous embodiments.

Figure 6:
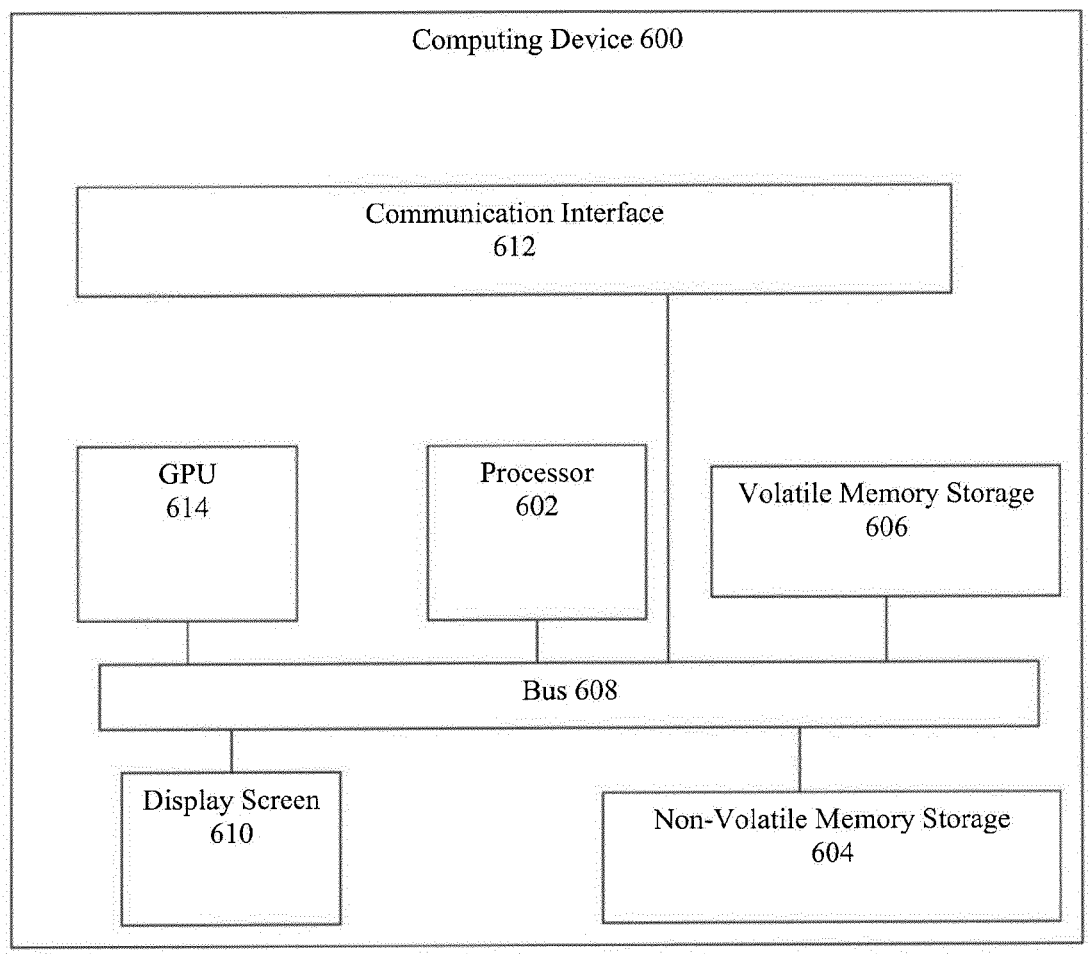
FIG. 6 is a block diagram of a computer system in which embodiments can be implemented.

FIG. 6 is an example computer system 600 in which embodiments of the present invention, or portions thereof, may be implemented as computer-readable code. For example, the components or modules of system 100, such as browser extension generator 114 and browser extension server 120 may be implemented in one or more computer systems 600 using hardware, software, firmware, tangible computer-readable media having instructions stored thereon, or a combination thereof and may be implemented in one or more computer systems or other processing systems. Modules and components in FIGS. 1-7 may be embodied in hardware, software, or any combination thereof.

Client computing device 106 or web server 104 may include one or more computing devices. Client computing device 106 or web serve 104 may include one or more processors 602, one or more non-volatile storage mediums 604, one or more memory devices 606, a communication infrastructure 608, a display screen 610 and a communication interface 612.

Processors 602 may include any conventional or special purpose processor, including, but not limited to, digital signal processor (DSP), field programmable gate array (FPGA), and application specific integrated circuit (ASIC).

GPU 614 is a specialized processor that executes instructions and programs, selected for complex graphics and mathematical operations, in parallel.

Non-volatile storage 604 may include one or more of a hard disk drive, flash memory, and like devices that may store computer program instructions and data on computer-readable media. One or more of non-volatile storage device 604 may be a removable storage device.

Memory devices 606 may include one or more volatile memory devices such as but not limited to, random access memory. Communication infrastructure 608 may include one or more device interconnection buses such as Ethernet, Peripheral Component Interconnect (PCI), and the like.

Typically, computer instructions are executed using one or more processors 602 and can be stored in non-volatile storage medium 604 or memory devices 606.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communications port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communications path. The communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for generating a menu of browser extensions comprising:
    detecting a first user interaction with a first set of information contained within a browser;
    determining a plurality of category classifications of the first set of information, the plurality of category classifications (i) changing based on the first set of information and (ii) providing different descriptions of the first set of information;
    determining a plurality of different browser extensions such that each browser extension includes a browser extension category that matches at least one browser extension classification of the plurality of browser extension classifications, wherein the plurality of browser extensions are executable applications that are configured to perform different operations on the first set of information such that the operations produce information that describe different characteristics of the first set of information;
    retrieving instances of the plurality of determined browser extensions, the instances being stored at a client device of a user or a remote browser extension server, and the storing and a location of retrieval based on a combination of a user preference and the first set of information;
    generating a first menu for display of the instances of the plurality of retrieved browser extensions;
    detecting a second user interaction with an instance of one of the retrieved browser extensions, wherein the second user interaction executes the instance of the retrieved browser extension;
    extracting a second set of information from one or more uniform resource locators in response to the second user interaction with the instance of the retrieved browser extension; and
    generating a second menu for display of the extracted second set of information.

2. The method of claim 1, wherein the first set of information is one or more words, phrases or objects.

3. The method of claim 1, wherein the first user interaction is a hover over the first set of information followed by one of a right click, left click, shift-click, or ctrl-click of the selected first set of information.

4. The method of claim 1, wherein the first user interaction is a selection of the first set of information followed by one of a right click, left click, shift-click, or ctrl-click of the selected first set of information.

5. The method of claim 1, wherein the plurality of browser extensions are retrieved from an online store.

6. The method of claim 1, wherein the second set of information provides data about the first set of information.

7. The method of claim 1 wherein extracting a second set of information further comprises:
    receiving one or more session identifiers from a server, wherein each session identifier is based on the plurality of retrieved browser extensions; and
    establishing one or more communication channels with the server based on the one or more session identifiers and the plurality of retrieved browser extensions.

8. A system for generating a menu of browser extensions comprising:
    a computing device comprising a processor and memory;
    a category identifier association module implemented on the computing device and configured to detect a first user interaction with a first set of information contained within a browser, and
    determine a plurality of category classifications of the first set of information, the plurality of category classifications (i) changing based on the first set of information and (ii) providing different descriptions of the first set of information, and determine a plurality of different browser extensions such that each browser extension includes a browser extension category that matches at least one browser extension classification of the plurality of identified browser extension classifications, wherein the plurality of browser extensions are executable applications that are configured to perform different operations on the first set of information such that the operations produce information that describe different characteristics of the first set of information;
    an extension manager implemented on the computing device and configured to retrieve instances of the plurality of identified browser extensions, the instances being stored at the computing device or at a remote browser extension server and the storing and a location of retrieval based on a combination of a user preference and the first set of information,
    detect a second user interaction with an instance of a retrieved browser extension, wherein the second user interaction executes the instance of the retrieved browser extension, and
    extract a second set of information from one or more uniform resource locators in response to the second user interaction with the instance of the retrieved browser extension; and
    a menu generator implemented on the computing device and configured to:

generate a first menu for display of the one or more retrieved browser extensions, and generate a second menu for display of the extracted second set of information.

9. The system of claim 8, wherein the extension manager is further configured to:
receive one or more session identifiers from a server, wherein each session identifier is based on the plurality of retrieved browser extensions; and
establish one or more communication channels with the server based on the one or more session identifiers and the plurality of retrieved browser extensions.

10. The system of claim 8, wherein the first set of information is one or more words, phrases or objects.

11. The system of claim 8, wherein the first user interaction is a hover over the first set of information followed by one of a right click, left click, shift-click, or ctrl-click.

12. The system of claim 8, wherein the first user interaction is a selection of the first set of information followed by one of a right click, left click, shift-click, or ctrl-click of the selected first set of information.

13. The system of claim 8, wherein the second set of information provides data about the first set of information.

14. A non-transitory computer readable storage medium having control logic stored therein that, when executed by a processor, causes the processor to perform operations comprising:
detecting a first user interaction with a first set of information;
determining a plurality of category classifications of the first set of information, the plurality of category classifications (i) changing based on the first set of information and (ii) providing different descriptions of the first set of information;
determining a plurality of different browser extensions such that each browser extension includes a browser extension category that matches at least one browser extension classification of the plurality of browser extension classifications, wherein the plurality of browser extensions are executable applications that are configured to perform different operations on the first set of information such that the operations produce information that describe different characteristics of the first set of information;
retrieving instances of the plurality of determined browser extensions, the instances being stored at a client device of a user or a remote browser extension server and the storing and a location of retrieval based on a combination of a user preference and the first set of information; and
generating a first menu for display of the instances of the plurality of retrieved browser extensions;
detecting a second user interaction with an instance of one of the retrieved browser extensions, wherein the second user interaction executes the instance of the retrieved browser extension;
extracting a second set of information from one or more uniform resource locators in response to the second user interaction with the instance of the retrieved browser extension; and
generating a second menu for display of the extracted second set of information.

15. The method of claim 1, further comprising:
determining that the plurality of browser extensions each have a browser extension category that is different from the identified plurality of browser extension classifications;
retrieving new browser extensions that have a browser extension category that matches the identified plurality of browser extension classifications; and
presenting the new browser extensions to the user in the first menu.

16. The method of claim 15, wherein the retrieving further comprises:
identifying new browser extensions that are most used by different users for a specific category.

* * * * *